United States Patent [19]
Chopin et al.

[11] Patent Number: 4,891,350
[45] Date of Patent: Jan. 2, 1990

[54] CATALYST SUPPORTS AND PROCESS FOR THEIR PREPARATION

[75] Inventors: Thierry Chopin, Saint Denis; Francois Garreau; Magali Knipper, both of Paris; Patrice Nortier, Romainville; Jean-Luc Schuppiser, Claye Souilly, all of France

[73] Assignee: Rhone-Poulenc Chimie, Courbevoie, France

[21] Appl. No.: 113,120

[22] Filed: Oct. 27, 1987

[30] Foreign Application Priority Data

Oct. 27, 1986 [FR] France ................................. 86 14888

[51] Int. Cl.⁴ ............................................. B01J 32/00
[52] U.S. Cl. ..................................................... 502/439

[58] Field of Search .................................. 502/439, 527

[56] References Cited

U.S. PATENT DOCUMENTS 4,483,940 11/1984 Ono et al. ...................... 502/527 X
4,532,228 7/1985 Golino et al. ................... 502/527 X Primary Examiner—W. J. Shine
Attorney, Agent, or Firm—Burns, Doane, Swecker & Mathis

[57] ABSTRACT

Monolithic catalyst substrates are more adherently coated with at least one oxide layer, by including in the coating composition a gum or biogum, preferably xanthan gum.

10 Claims, No Drawings

CATALYST SUPPORTS AND PROCESS FOR THEIR PREPARATION

BACKGROUND OF THE INVENTION

1. Field of the Invention

The present invention relates to novel catalysts, and, more especially, to novel catalysts comprising a support substrate having an oxide layer deposited thereon, said oxide layer being more firmly and permanently adhered to its support by means of a gum or biogum.

2. Description of the Prior Art

A wide variety of catalysts are known to this art consisting of a substrate coated with a film or layer of refractory oxides, onto which a catalytically active phase is deposited. These are useful in numerous gaseous phase reactions. For example, the catalytic conversion of internal combustion engine exhaust gases, whether gasoline or diesel, is presently typically accomplished using catalysts comprising a ceramic or metallic substrate in the form of an inert and rigid (monolithic) structure having a honeycomb configuration coated with a film or layer of oxides, such as alumina, onto which the active phase is deposited.

Monolithic supports are generally produced by depositing one or more layers of oxides onto the monolithic substrate. Such a process is described, for example, in French Patent No. 2,512,004, assigned to the assignee hereof.

In the process described in this patent, an aqueous suspension is formed from a mixture of alumina powders. This mixture includes a charge and a binder, the latter consisting essentially of the dispersible fraction of the mixture. The substrate is immersed in the aqueous suspension, then permitted to drip and drain, and is next dried and then calcined.

The mechanical properties and the adherence of the layers deposited in this manner are an important factor in the quality of the catalyst. It is known to this art that the monolithic catalysts that are particularly useful for vehicular catalytic converters are subjected to high temperatures, great variations in temperature, and considerable mechanical vibrations while in use.

These thermal and mechanical stresses tend to cause peeling of the catalyst layers and thus a loss in the amount of oxides deposited, which obviously gives rise to a reduction in the effectiveness of the catalyst over the long term.

SUMMARY OF THE INVENTION

Accordingly, a major object of the present invention is the provision of an improved catalyst comprised of a support substrate coated with an oxide layer(s), and wherein the oxide layer or layers are more firmly adhered to the substrates therefor.

Another object of this invention is the provision of a facile process for the production of coated catalyst substrates, which process departs from the conventional oxide-deposition techniques in but a single characteristic respect.

Briefly, the present invention features production of a catalyst support of the type comprising a deposit of a coating composition on a monolithic substrate, wherein the contacting of the substrate with the coating composition is carried out in the presence of a gum or biogum. The oxide layer of the catalyst support thus produced contains the residue of the gum or biogum interspersed therein.

In a preferred embodiment of the invention, the biogum is prepared by the fermentation of a carbohydrate using bacteria of the genus Xanthomonas.

DETAILED DESCRIPTION OF THE PREFERRED EMBODIMENTS OF THE INVENTION

More particularly according to the present invention, it has now unexpectedly and surprisingly been determined that incorporating a gum or biogum in a catalyst support coating composition results in a very significant improvement in the quality of the coatings deposited.

The invention is applicable to all types of monolithic substrates, particularly to metallic and ceramic substrates.

The metallic substrates are especially those produced from alloys of chromium, aluminum and cobalt, such as those marketed under the trademark KANTHAL, or those produced from alloys of iron, chromium, aluminum and yttrium, marketed under the trademark FECRALLOY. The metal may also be a carbon steel, or a simple cast iron.

The ceramic monoliths are particularly those containing, as the principal material: cordierite, alumina, mullite, zirconia, zirconmullit, barium or aluminum titanate, porcelain, thorium oxide, magnesium oxide, steatite, boron or silicon carbides, silicon nitride, etc.

These substrates have a cellular structure in a honeycomb configuration which may be hexagonal, tetragonal, triangular or undulating, and which permit the free passage of the gas in the channels or conduits thereof that are formed during their manufacture (by extrusion, rolling, etc.).

According to the present invention, the substrates of the aforedescribed type are coated with a coating composition. Such coating composition may be of any known type. Fundamentally, it is based on the refractory oxides.

Exemplary of the refractory oxides, the following oxides are representative: the oxides of magnesium, calcium, strontium, barium, scandium, yttrium, the lanthanides, gallium, indium, thallium, silicon, titanium, zirconium, hafnium, thorium, germanium, tin, lead, vanadium, niobium, tantalum, chromium, molybdenum, tungsten, rhenium, iron, cobalt, nickel, copper, zinc, bismuth.

In a preferred embodiment of the invention, an alumina-based composition is used.

It will be appreciated that it is envisaged to coat the substrate with either one or several layers of the coating compositions. Furthermore, the same composition may contain a mixture of oxides of the aforecited type.

Mixed oxides based on the elements mentioned above, such as magnesium aluminate, lanthanum aluminate, barium aluminate, nickel, zinc or copper aluminates, are representative.

These mixtures of oxides or mixed oxides may be obtained either by physical mixing, or by the impregnation of a salt onto a previously prepared oxide, or by coprecipitation from a mixture of salts.

In one embodiment of the invention, a composition of the type described in the aforenoted French Patent No. 2,512,004 is used, which patent is hereby expressly incorporated by reference.

According to this embodiment, the coating composition, which contains alumina, is an aqueous composition comprising a binder consisting essentially of a dispersed fraction and a charge essentially constituting the undispersed fraction of the composition.

The alumina binder may be selected from among aqueous suspensions or dispersions of fine or ultrafine boehmites, pseudo-boehmites, amorphous alumina gels, gels of aluminum hydroxide or ultrafine hydrargillite.

The alumina binder may optionally be replaced, at least in part, by a silica sol.

With respect to such charge, it may be selected from among hydrated alumina compounds and the dehydrated or partially dehydrated form of these compounds, and in particular from among hydrargillite, bayerite, boehmite, pseudo-boehmite, amorphous or essentially amorphous alumina gels, compounds of transition alumina containing at least one of the phases of the group consisting of the rho, chi, eta, gamma, kappa, theta, delta and alpha phases.

Optionally, the alumina charge may be replaced, at least in part, by an oxide selected from among the aforementioned refractory oxides.

It is an essential characteristic of this invention that the catalyst supports be conditioned using a gum or biogum.

Natural gums of vegetable or animal origin are exemplary of the gums.

Representative biogums are those heteropolysaccharides microbial in origin. Advantageously, these are high molecular weight linear exocellular materials, preferably having a molecular weight in excess of one million. They are obtained, in particular, by the fermentation of a carbohydrate under the action of bacteria of the genus Xanthomonas or Arthrobacter, or fungi of the genus Sclerotium.

Representative species of bacteria or fungi that are useful for the production of these heteropolysaccharides comprise, for example: *Xanthomonas Begoniae, Xanthomonas Campestris, Xanthomonas Carotea, Xanthomonas Hederae, Xanthomonas Incanae, Xanthomonas Malvacearum, Xanthomonas Papavericola, Xanthomonas Phaseoli, Xanthomonas Pisi, Xanthomonas Vasculorum, Xanthomonas Vesicatoria, Xanthomonas Vitians, Xanthomonas Pelargonii; Arthobacter Stabilis, Arthobacter Viscosus; Sclerotium Glucanicum, Sclerotium Rolfsii.*

Preferably, the biogum is a xanthan gum produced by the fermentation of a carbohydrate under the action of bacteria of the genus Xanthomonas.

The species especially suitable for this type of fermentation comprise *Xanthomonas Begoniae, Xanthomonas Campestris, Xanthomonas Incanae* and *Xanthomonas Pisi.*

Xanthan gum is a heteropolysaccharide having a molecular weight greater than $10^6$. It contains D-glucose, D-mannose and D-glucuronate moieties in the molecular ratios of 2.8/2.0/2.0. It is partially acetylated with approximately 4.7% of acetyl radicals. It also contains approximately 3% pyruvate radicals bonded to a single lateral chain of D-glucopyranosyl links.

The coating compositions and the gum or biogum are generally used in the form of a suspension. It is possible to first formulate a suspension of a gum or biogum, and then introduce the component elements of the coating composition therein.

The characteristics of the suspension obtained in this manner are adjusted in a manner known per se by optionally adding an acid and regulating the oxide content such as to provide adequate pH values and viscosities.

Generally, a gum or biogum suspension having a maximum gum content of 0.5%, and preferably 0.25% relative to the water, is used. In such a case, the preparation of the supports is carried out conventionally.

The actual contacting of the substrate with the coating composition and the gum or biogum is carried out using art recognized techniques. Generally, the substrate is immersed in the gum or biogum suspension and the coating composition such as to completely fill all of the channels or voids of said substrate. It is also possible to pour the composition into the channels of the substrate. The above operation is followed by a partial dripping of the channels and then draining them, for example by means of a stream of compressed air. Coagulation is effected by thermal or chemical means and the substrate is dried, if necessary. The coated substrate may be calcined at a temperature ranging from 300° C. to 1100° C., for example, this temperature being adjusted as a function of the specific surface of the coating desired.

In order to increase the thickness of the coating produced, a second coating may be applied, followed by a third, etc.

The supports obtained in this manner are well suited for the treatment of the exhaust gases of internal combustion engines, for hydrodesulfuration, hydrodemetallization, hydrodenitrification, the recovery of sulfur from sulfur compounds, dehydration, reforming, steam reforming, dehydrohalogenation, hydrocracking, hydrogenation, dehydrogenation, the dehydrocyclization of hydrocarbons or other organic compounds, oxidation and reduction reactions, and the like.

In order to further illustrate the present invention and the advantages thereof, the following specific examples are given, it being understood that same are intended only as illustrative and in nowise limitative.

EXAMPLE 1

This example illustrates a thermal shock test enabling the measurement of the loss of coating on monolithic specimens of given dimensions.

From a coated monolithic support, a parallelepipedic specimen of approximately 32×45 ×45 mm was obtained. The face surfaces of the specimen were brushed in order to eliminate all roughness. The specimen was then washed in demineralized water, sprayed with compressed air, then dried for 8 hr at 120° C. After a second air blow, the specimen was calcined for 1 hr at 550° C., then cooled in a desiccator in a closed weighing box. The weight of the specimen before testing was determined after cooling.

The specimen is then heated for 20 min at 600° C. and immediately immersed in 2 liters of demineralized water at ambient temperature upon removal from the furnace.

The specimen was then blown with compressed air, dried for 8 hr at 120°C. and calcined for 1 hr at 550° C., whereupon it was cooled in a desiccator in a closed weighing box. The weight of the specimen determined after cooling is the weight after the test.

In the above manner, the loss of coating due to thermal shock is obtained; it is expressed in weight percent of the coating removed relative to the initial weight of the coating.

EXAMPLE 2 (Comparative):

A mixture of SCS 149 P alumina marketed by RHONE-POULENC (used as the charge) and DISPERSAL 10/3 marketed by CONDEA (used as the binder) was prepared in weight proportions, calculated as $Al_2O_3$, of 80/20, respectively.

The mixture was placed in aqueous dispersion in an acetic acid solution such as to provide a total dry solids content of 28% by weight and a content of acetic acid of 2.5% by weight relative to the dry solids content.

This suspension was ground in a continuously operating NETZSCHE LME1 grinder at a rate of 22.5 liters per hour. The apparent viscosity of the suspension prepared in this manner was 28 mPa.s, measured using a velocity gradient of $101 \, s^{-1}$.

According to the process of French Patent No. 2,512,004, a cordierite monolith marketed by the CORNING GLASS Co., was prepared in the form of a "Race Track" having 400 openings per square inch. In this manner, a deposit of 100 g/l was produced, but this deposit peeled off in sheets after calcination.

The measurement of the loss of alumina from such a specimen, according to the procedure described in Example 1, gave a value of 9.7% by weight.

EXAMPLE 3

The mixture of powders of Example 2 was used, dispersed in an aqueous suspension of xanthan gum (containing 0.1% by weight of xanthan gum relative to the water) in order to provide a dry solids content of 30% by weight in the resulting suspension. The dispersion, when ground in a continuous NETZSCHE LME 1 grinder at a rate of 25 l/hr, had an apparent viscosity of 51 mPa.s.

A monolith was coated under the conditions described in Example 2 to produce a deposit of 118 g/l.

The test described in Example 1 gave a value for the loss of deposit of 0.15% by weight.

EXAMPLE 4

A suspension was prepared in the same manner as in the two preceding examples, but in this example the dry solids content was lowered to 29% by weight, and 1.5% acetic acid (% by weight relative to the dry extract) was added to the suspension. The suspension was ground as in Example 3. Its apparent viscosity was then 43 mPa.s.

Using this suspension, a monolith was coated under the conditions described in Example 2, to produce a deposit of 107 g/l.

The test described in Example 1 gave a value for the loss of deposit of 0.17% by weight.

The above examples clearly demonstrate that the addition of the gum results in a very significant improvement in the quality of the catalyst coatings.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A catalyst support which comprises a monolithic substrate adherently coated with at least one oxide layer, said at least one oxide layer containing the residue of a gum or biogum interspersed therein.

2. The catalyst support as defined by claim 1, said monolithic substrate comprising a metal or ceramic.

3. The catalyst support as defined by claim 2, having a honeycomb configuration.

4. The catalyst support as defined by claim 1, said at least one oxide layer containing the residue of a xanthan gum.

5. A catalyst comprising the shaped support as defined by claim 1, coated with an active catalytic phase.

6. A process for the preparation of a catalyst support, comprising coating a monolithic substrate with a liquid composition including a mixture of an oxide and a gum or biogum, and forming a residue of said gum or biogum in which at least one layer of said oxide contains the said residue of the gum or biogum interspersed therein.

7. The process as defined by claim 6, said liquid composition comprising an aqueous suspension of the gum or biogum.

8. The process as defined by claim 6, comprising immersing said monolithic substrate in the liquid composition.

9. The process as defined by claim 6, said liquid composition comprising alumina.

10. The product of the process as defined by claim 6.

* * * * *